United States Patent
Hart et al.

(10) Patent No.: US 9,397,919 B1
(45) Date of Patent: Jul. 19, 2016

(54) METHOD OF OFFLOADING TRAFFIC IN A WIRELESS COMMUNICATION NETWORK

(71) Applicant: Sprint Spectrum LP, Overland Park, KS (US)

(72) Inventors: Kevin Hart, Oakton, VA (US); Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 153 days.

(21) Appl. No.: 14/070,317

(22) Filed: Nov. 1, 2013

(51) Int. Cl.
*H04L 12/26* (2006.01)

(52) U.S. Cl.
CPC .................................. *H04L 43/0894* (2013.01)

(58) Field of Classification Search
None
See application file for complete search history.

(56) References Cited

U.S. PATENT DOCUMENTS

| | | | |
|---|---|---|---|
| 2008/0151851 A1 | 6/2008 | Sitch | |
| 2011/0320588 A1* | 12/2011 | Raleigh | H04W 36/245 709/224 |
| 2012/0129517 A1* | 5/2012 | Fox | H04L 41/5025 455/425 |
| 2013/0070594 A1* | 3/2013 | Garcia Martin | H04W 28/08 370/235 |
| 2014/0079022 A1* | 3/2014 | Wang | H04W 36/22 370/331 |

\* cited by examiner

*Primary Examiner* — Awet Haile

(57) ABSTRACT

Systems and methods for offloading traffic in a wireless communication system are provided. It can be determined at a network node that a performance parameter of an access node meets a performance threshold. A profile of a wireless device in communication with the access node can be determined where the profile comprises an acceptable offloading condition. A plurality of offloading mechanisms can be identified based on the performance parameter and the acceptable offloading condition. An estimated change in the performance parameter can be determined for each combination of one of the plurality of offloading mechanisms and the acceptable offloading condition. An offloading mechanism can be selected based on the estimated change in the performance parameter and the acceptable offloading condition. The wireless device can be instructed to establish communication with the wireless communication system using the selected offloading mechanism.

20 Claims, 8 Drawing Sheets

METHOD OF OFFLOADING TRAFFIC IN A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

In addition, wireless communication networks can implement various methods of maintaining a communication link with a wireless device. Network infrastructure can be used to support a high number of simultaneous cellular communication links with wireless devices. However, network infrastructure hardware has limitations that can easily be exceeded as the number of wireless devices running applications in constant communication with the network increases. When the network reaches usage thresholds, service interruptions can occur causing an undesirable user experience.

A network operator can ease network congestion at access nodes by offloading wireless device traffic using various offloading mechanisms. For example, the wireless device can be handed over to a different access node where the target access node is associated with the same network operator and/or a different network operator, the wireless device can be handed over to a different frequency band of the same and/or different radio access technology, the wireless device can be handed over to a micro cell access node such as a Femtocell or a picocell access node, or another wireless device can be activated to be an access node such that the wireless device becomes a Wi-Fi hotspot. However, initiating communications with the wireless communication network using one of the various offloading mechanisms can negatively impact performance of the wireless device as well as reduce the quality of service received by the wireless device.

Overview

Systems and methods for offloading traffic in a wireless communication system are provided. It can be determined at a network node that a performance parameter of an access node meets a performance threshold. A profile of a wireless device in communication with the access node can be determined where the profile comprises an acceptable offloading condition. A plurality of offloading mechanisms can be identified based on the performance parameter and the acceptable offloading condition. An estimated change in the performance parameter can be determined for each combination of one of the plurality of offloading mechanisms and the acceptable offloading condition. An offloading mechanism can be selected based on the estimated change in the performance parameter and the acceptable offloading condition. The wireless device can be instructed to establish communication with the wireless communication system using the selected offloading mechanism.

DETAILED DESCRIPTION

Figure 1:
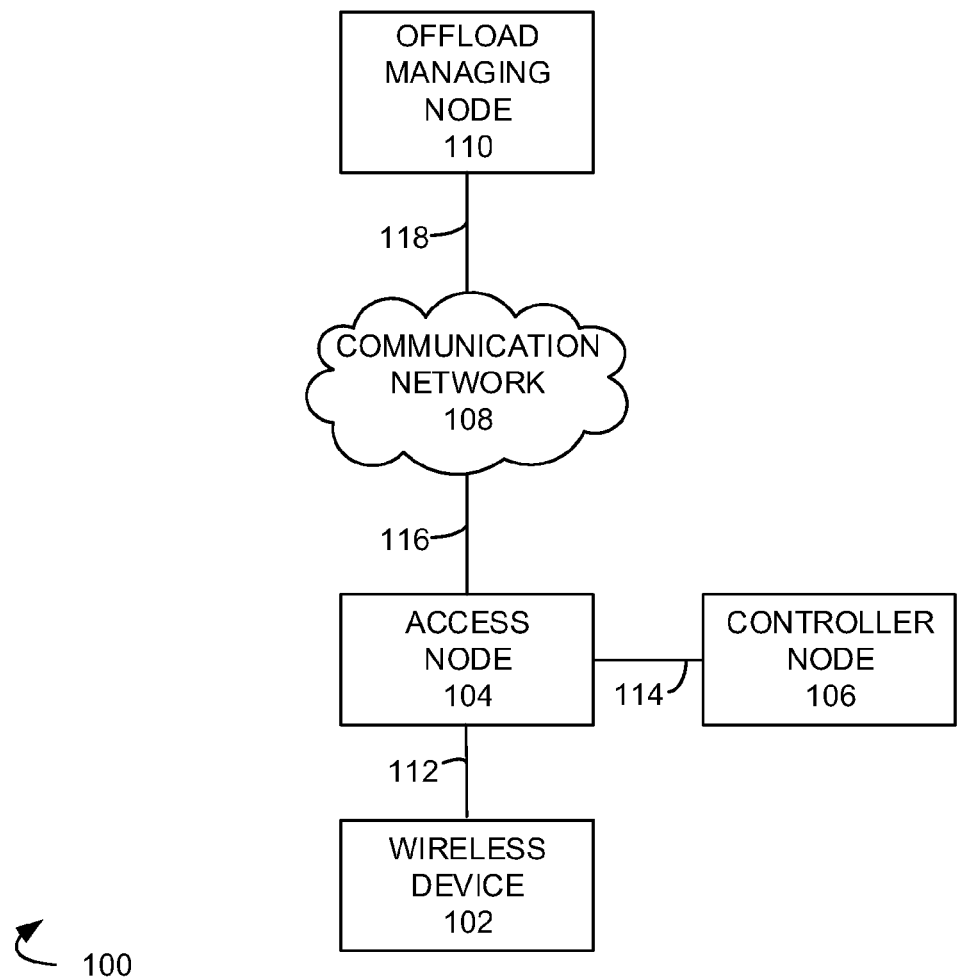
FIG. 1 illustrates a communication system to offload traffic in a wireless communication network.

FIG. 1 illustrates an exemplary communication system 100 for offloading traffic in a wireless communication network. Communication system 100 can comprise wireless device 102, access node 104, controller node 106, communication network 108, and offload managing node 110. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access node 106 and communication network 110, which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented according to various exemplary embodiments disclosed herein.

The wireless interface of wireless device 102 can include one or more transceivers for transmitting and receiving data over communication system 100. Each transceiver can be associated with a different frequency bands, the same or different radio access technologies, and/or the same or different network providers. For example, wireless device 102 can include a transceiver associated with at least one wireless cellular protocol and/or other types of wireless communication. For example, a transceiver can be associated with code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), etc.

Wireless device 102 can be in communication with access node 106 through communication link 112. Link 112 can use various communication media, such as air, space, metal, optical fiber, or some other signal propagation path—including combinations thereof. Communication link 112 may comprise many different signals sharing the same link. Communication link 112 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link, but be transferred over different communication sessions, frequencies, timeslots, packets, ports, sockets, logical transport links, or in different directions—including combinations thereof.

Wireless device 102 can communicate information over system 100 using various communication services. These services can include various voice and/or data services and applications. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access node 104 can be any network node configured to provide communication between wireless device 102 and communication network 108. For example, access node 104 can be selected from a base transceiver station, a radio base station, an eNodeB device, or an enhanced eNodeB device, or the like. It is noted that while only one access node 104 is illustrated in FIG. 1, any number of access nodes can be implemented within system 100.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Controller node 106 can be any network node configured to communicate information or control information over system 100. Controller node 106 can be a standalone computing device, computing system, or network component, and can be accessible, for example, by a wired or wireless connection, or through an indirect connection such as through a computer network or communication network. For example, controller node 106 can include a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 106 is not limited to any specific technology architecture, such as Long Term Evolution (LTE) and can be used with any network architecture and/or protocol.

Controller node 106 can comprise a processor and associated circuitry to execute or direct the execution of computer-readable instructions to obtain information. Controller node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 106 can receive instructions and other input at a user interface.

Offload managing node 110 can be any network node configured to manage offloading mechanisms in the system 100. Offload managing node 110 can be a standalone computing device, computing system, or network component, and can be accessible, for example, by a wired or wireless connection, or through an indirect connection such as through a computer network or communication network. For example, offload managing node 110 can include an offload control server, an offload control server database, an offload opportunity server, an offload opportunity server database. One of ordinary skill in the art would recognize that offload managing node 110 is not limited to any specific technology architecture, such as Long Term Evolution (LTE) and can be used with any network architecture and/or protocol.

Offload managing node 110 can comprise a processor and associated circuitry to execute or direct the execution of computer-readable instructions to obtain information. Offload managing node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Offload managing node 110 can receive instructions and other input at a user interface.

Controller node 106 can be in communication with access node 104 through communication link 114. Access node 104 can be in communication with communication network 108 through communication link 116. Communication network 108 can be in communication with offload managing node 110 through communication link 118. Communication links 114, 116, 118 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 114, 116, 118 can be a direct link or might include various equipment, intermediate components, systems, and networks.

Communication network 108 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 108 can be capable of carrying data, for example, to support voice, push-to-talk, and data communications by a wireless device such as wireless device 102. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

In operation, it can be determined that a performance parameter of an access node meets a performance threshold. For example, a performance parameter can be indicative of network performance parameters such as capacity, connection, coverage, or the like. When the performance parameter meets a performance threshold, a profile of a wireless device in communication with the access node can be determined. The wireless device profile can comprise an acceptable offloading condition. For example, the wireless device user can preselect conditions in which the wireless device can be offloaded from the access node to an alternative offloading mechanism. A plurality of offloading mechanisms can be identified based on the performance parameter and the acceptable offloading condition. Offloading mechanisms can include offloading the wireless device to a different access node where the target access node is associated with the same network operator and/or a different network operator, offloading the wireless device to a different frequency band of the same and/or different radio access technology, offloading the wireless device to a micro cell access node such as a Femtocell or a picocell access node, activating another wireless device as a hotspot and offloading the wireless device to hotspot, or a combination thereof. An estimated change in the performance parameter can be determined for each combination of one of the plurality of offloading mechanisms and the acceptable offloading conditions. For example, a determination can be made as to the amount of relief each offloading mechanism would provide to the access node and which offloading mechanisms and conditions the wireless device user preselected. An offloading mechanism can be selected based on the estimated change in the performance parameter and the acceptable offloading condition. The wireless device can then be instructed to establish communication with the wireless communication network using the selected offloading mechanism.

Figure 2:
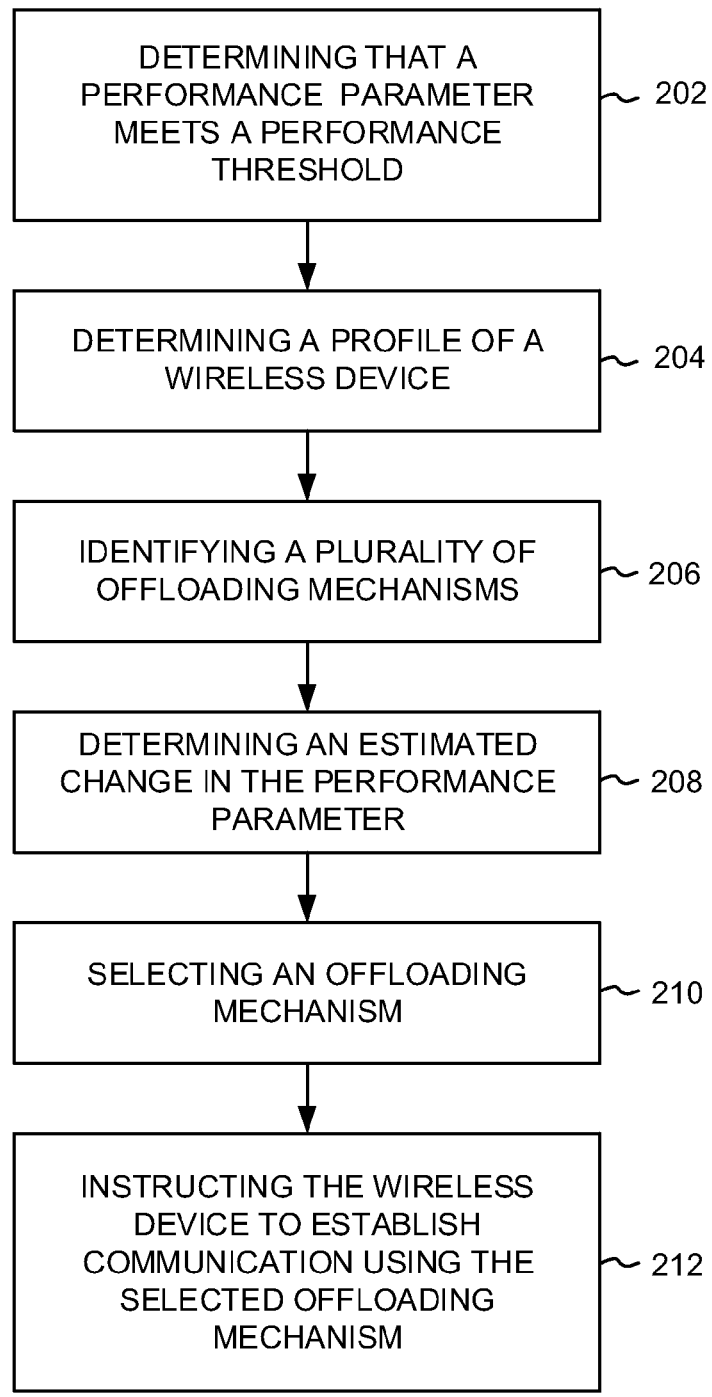
FIG. 2 illustrates an exemplary method of offloading traffic in a wireless communication network.

FIG. 2 illustrates a flow chart of an exemplary method of assigning resources in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a network node can determine that a performance parameter of an access node meets a performance threshold. For example, the offload managing node 110 can receive an indication that a performance parameter of access node 104 meets a performance threshold. The performance parameter can be indicative of throughput capacity, connection capacity, coverage capacity, or a combination thereof. The throughput capacity can be indicative of the amount of bandwidth the access node can assign to the wireless device, where the bandwidth can be based on an application running on the wireless device and the application can have an application requirement such as a minimum data rate, a maximum permitted delay, a maximum permitted error rate, a routing or scheduling priority associated with data traffic of the application, etc. The connection capacity can be indicative of the number of wireless devices in communication with the access node. The coverage capacity can be indicative of a coverage area of the access node, signal strength, interference, etc. The performance threshold can be indicative of an undesirable level of network congestion such that when the performance parameter meets the performance threshold an offloading process can be initiated.

A profile of a wireless device in communication with the access node can be determined at 204. For example, a profile associated with wireless device 102 can be determined by the offload managing node 110. The profile can include information based on the types of offload mechanisms in which the user of wireless device 102 is willing to participate. For instance, the selection of offloading mechanisms can be based on the impact such offloading mechanism will have on the quality of service to wireless device 102. In addition, the selection of the offloading mechanism can be further based on various situations such as time (e.g. morning, afternoon, evening, etc.), day of the week, season (e.g. winter, spring, summer, fall), environment (e.g. weather, etc.), location condition (e.g. highway, concert, sporting event, urban/rural, etc.), etc. The profile can further include information relating to a type of compensation the user of the wireless device 102 would accept for each offloading mechanism. For instance, types of compensations can include an improved quality of service without additional cost, billing credits, equipment upgrade credits, etc. The profile can be stored in a database within offloading node 110 or be a separate network element.

At 206, a plurality of offloading mechanisms can be identified based on the performance parameter and the acceptable offloading condition. For example, offloading managing node 110 can identify a different access node such as a target access node in which wireless device 102 can establish a communication link, where the target access node is associated with the same network operator and/or a different network operator as access node 104. The target access node can also be of the same radio access technology associated with access node 104 or a different radio access technology. For instance, access node 104 could be associated with cellular radio technology and an identified offloading mechanism can include an access node having WiFi radio access technology. Offloading managing node 110 can identify a different frequency band of the same and/or different radio access technology associated with access node 104. Further, offloading managing node 110 can identify a micro cell access node such as a Femtocell or a picocell access node. The offloading managing node 110 can also identify another wireless device in communication with access node 104 where the alternative wireless device can be configured to be initiated as a Wi-Fi hotspot.

An estimated change in the performance parameter for each combination of one of the plurality of offloading mechanisms and the acceptable offloading condition can be determined at 208. For example, the offload managing node 110 can estimate a change in the performance parameter such as capacity, connection, and/or coverage relief that would occur based on each offloading mechanism. In addition, the offload managing node 110 can estimate the change in the performance parameter for each acceptable offloading condition preselected by the user of wireless device 102.

At 210, an offloading mechanism can be selected based on the estimated change in the performance parameter and the acceptable offloading condition. For example, offload managing node 110 can rank the offloading mechanisms based on the estimated change in the performance parameter in order to optimize relief to the network while reducing the number of wireless devices undesirably affected by the offloading process.

After an offloading mechanism is selected, the wireless device can be instructed to establish communication with the wireless communication network using the selected offloading mechanism at 212. For example, offload managing node 110 can instruct wireless device 102 to initiate communications with the selected offloading mechanism. The offload managing node 110 can further instruct wireless device 102 to discontinue communications with access node 104.

The network node can further monitor the performance parameter and/or wireless device criteria after the offloading mechanism is initiated. For example, offload managing node 110 can monitor whether the offloading mechanism should be modified or terminated by monitoring updated performance parameters of the access node. When it is determined that the offloading mechanism should be terminated because the performance parameters do not meet the performance threshold, the offloading managing node 110 can instruct wireless device 102 to reestablish communication with access node 104. Alternatively, the offload managing node 110 can monitor criteria of the wireless device, such as the battery level, signal strength, application usage, etc. When the criteria, such as the battery level, drops below a predetermined threshold, the offload managing node 110 can determine whether the selected offload mechanism should be modified or terminated.

During the time that the offloading process is initiated, the network node can monitor the wireless device selected in the offloading process and a selected compensation associated with the offloading mechanism indicated within the profile. In addition, the network node can determine additional wireless devices that would have benefited from the selected offloading mechanism but did not include an acceptable offloading condition within the wireless device profile. The network can communicate to those wireless devices the benefits that each wireless device would have experienced if the profile indicated a similar acceptable offloading condition.

Figure 3:
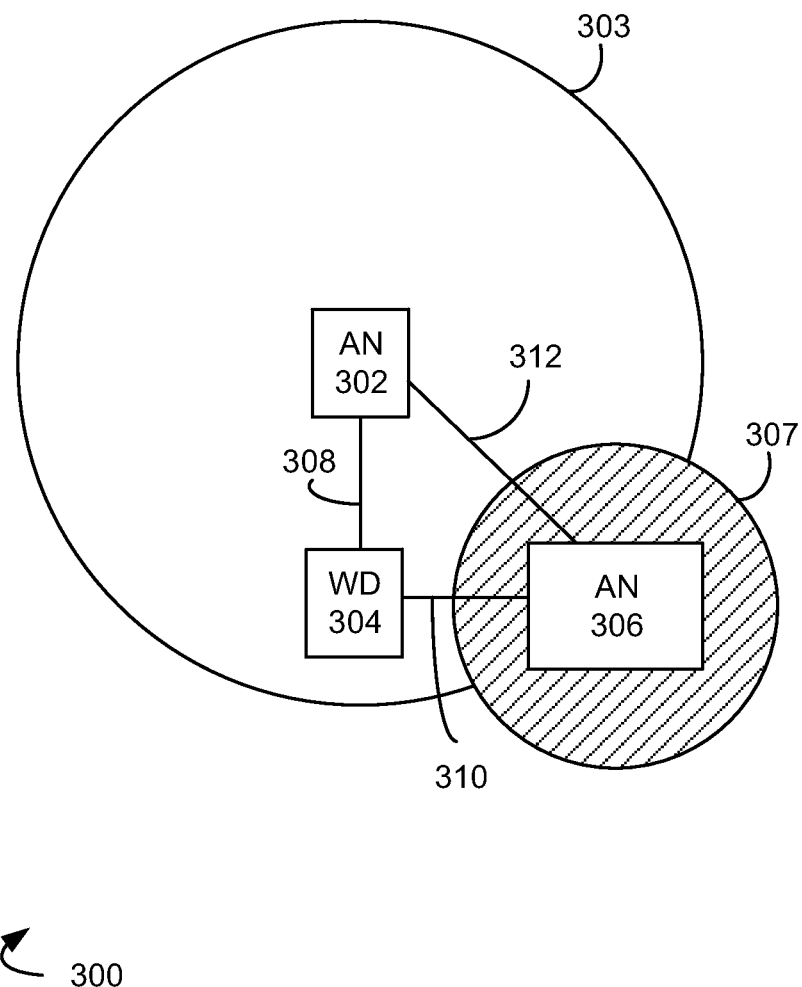
FIGS. 3-5 illustrate various exemplary offloading scenarios according to exemplary embodiments of the present disclosure.
Figure 4:
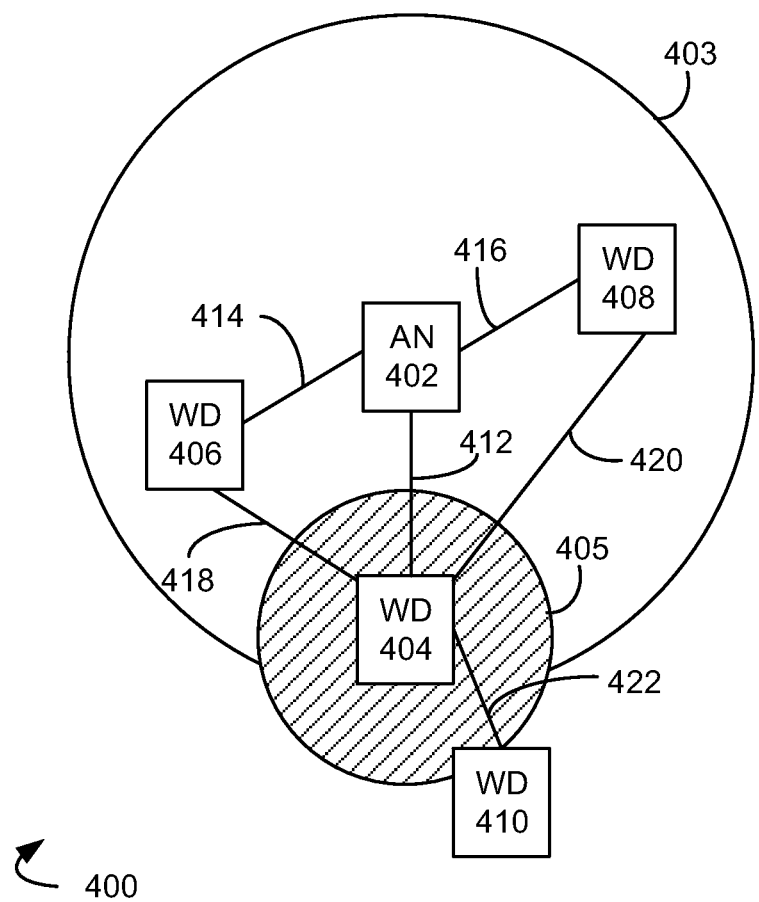
Figure 5:
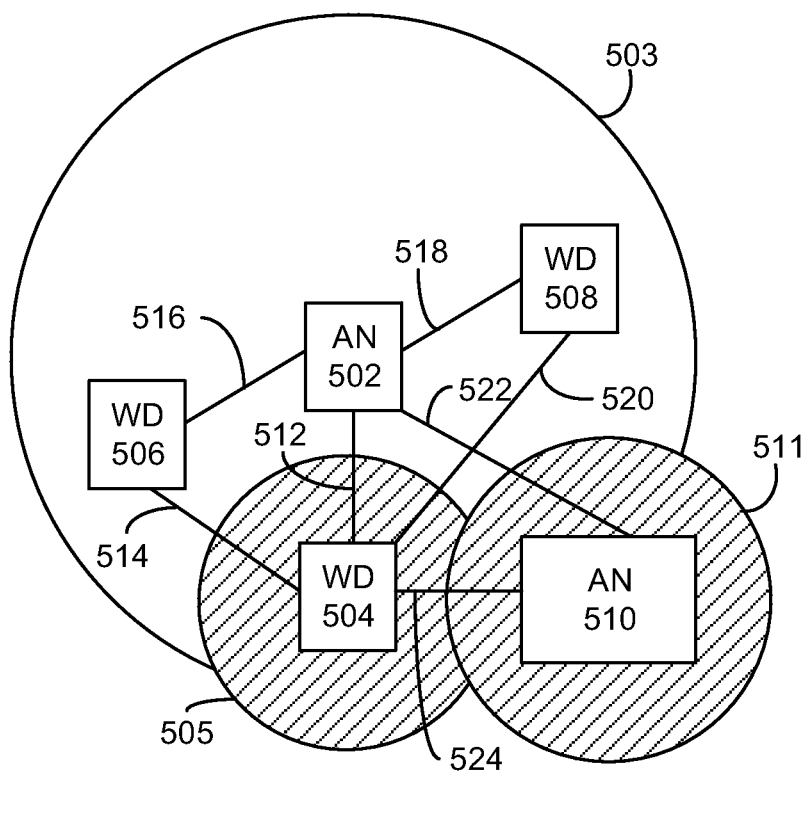

FIGS. 3-5 illustrate various offloading mechanism scenarios according to exemplary embodiments of the present disclosure. FIG. 3 illustrates an exemplary communication system 300 for offloading traffic in a wireless communication network. Communication system 300 can comprise wireless device 304, access node 302, and access node 306 where access node 306 can be a different radio access technology from access node 302. For example, access node 306 can be a WiFi access node having a coverage area 307 different from but overlapping with at least a portion of the coverage area 303 of access node 302.

Access node 302 can send a performance parameter to a network node (not shown) where the performance parameter can be indicative of network performance parameters such as capacity, connection, coverage, or the like associated with access node 302. When the performance parameter meets a threshold, the network node can select to initiate an offloading process using access node 306. For example, access node 306 can receive an indication to initiate communication with access node 302 over communication link 312. Wireless device 304 can receive an indication to initiate communication with access node 306 over communication link 310 where data will be transferred between wireless device 304 and access node 302 via access node 306 rather than over communication link 308. The network node may select access node 306 as the offloading mechanism in various situations such as when capacity, coverage, and/or connection performance of access node 302 is undesirable.

FIG. 4 illustrates an exemplary communication system 400 for offloading traffic in a wireless communication network. Communication system 400 can comprise access node 402, wireless devices 404, 406, 408, and 410. Wireless device 404 can be a multi-mode device capable of being initiated as a wireless hotspot. Wireless device 404 can be in communication with access node 402 over communication link 412. Wireless device 406 can be in communication with access node 402 over communication link 414. Wireless device 408 can be in communication with access node 402 over communication link 416.

Access node 402 can send a performance parameter to a network node (not shown) where the performance parameter can be indicative of network performance parameters such as capacity, connection, coverage, or the like, associated with access node 402. When the performance parameter meets a threshold, the network node can initiate an offloading process by selecting to initiate wireless device 404 as a wireless hotspot. For example, wireless device 404 can receive instructions to activate the transceiver capable to convert wireless device 404 into a wireless hotspot. After wireless device 404 initiates wireless hotspot capabilities, wireless devices 406, 408 can be instructed to establish communication with wireless device 404, such as for example over communication links 418, 420, respectively. Wireless devices 406, 408 can be further instructed to discontinue communication with access node 402 over communication links 414, 416, respectively. In addition, depending on the location of wireless device 404, when wireless device 404 is activated as a wireless hotspot, the coverage area 405 of wireless device 404 can extend beyond the coverage area of access node 405. Therefore, wireless devices not originally in communication with access node 402, for example wireless device 410, can be instructed to initiate communication with the network via wireless device 404. The network node may select to activate wireless device 404 as a hotspot in various situations such as capacity, connection, and/or coverage performance of access node 402 is undesirable.

FIG. 5 illustrates an exemplary communication system 500 for offloading traffic in a wireless communication network. Communication system 500 can comprise access node 502, wireless devices 504, 506, 508, and access node 510, where access node 510 can be a different radio access technology from access node 502. In addition, wireless device 504 can be a multi-mode device capable of being initiated as a wireless hotspot. Wireless device 504 can be in communication with access node 502 over communication link 512. Wireless device 506 can be in communication with access node 502 over communication link 516. Wireless device 508 can be in communication with access node 502 over communication link 518.

Access node 502 can send a performance parameter to a network node (not shown) where the performance parameter can be indicative of network performance parameters such as capacity, connection, coverage or the like, associated with access node 502. When the performance parameter meets a threshold, the network node can initiate an offloading process by initiating wireless device 504 as a wireless hotspot and establishing communications with access node 510. Access node 510 can be a WiFi access node having a coverage area 511 and wireless device 504 can have a coverage area of 505 where coverage areas 505, 511 can overlap at least a portion of coverage area 503 of access node 502.

Wireless device 504 can receive instructions to activate the transceiver capable to convert wireless device 504 into a wireless hotspot. Wireless device 504 can further receive instructions to establish communications with access node 510 over communication link 524. After wireless device 504 initiates wireless hotspot capabilities and establishes communication with access node 510, wireless devices 506, 508 can be instructed to establish communication with wireless device 504 over communication links 514, 520, respectively. Wireless devices can be further instructed to discontinue communication with access node 502 over communication links 516, 518, respectively. The network node may select to activate wireless device 504 as a hotspot and access node 510 in various situations such as capacity, connection, and/or coverage performance of access node 502 is undesirable.

Figure 6:
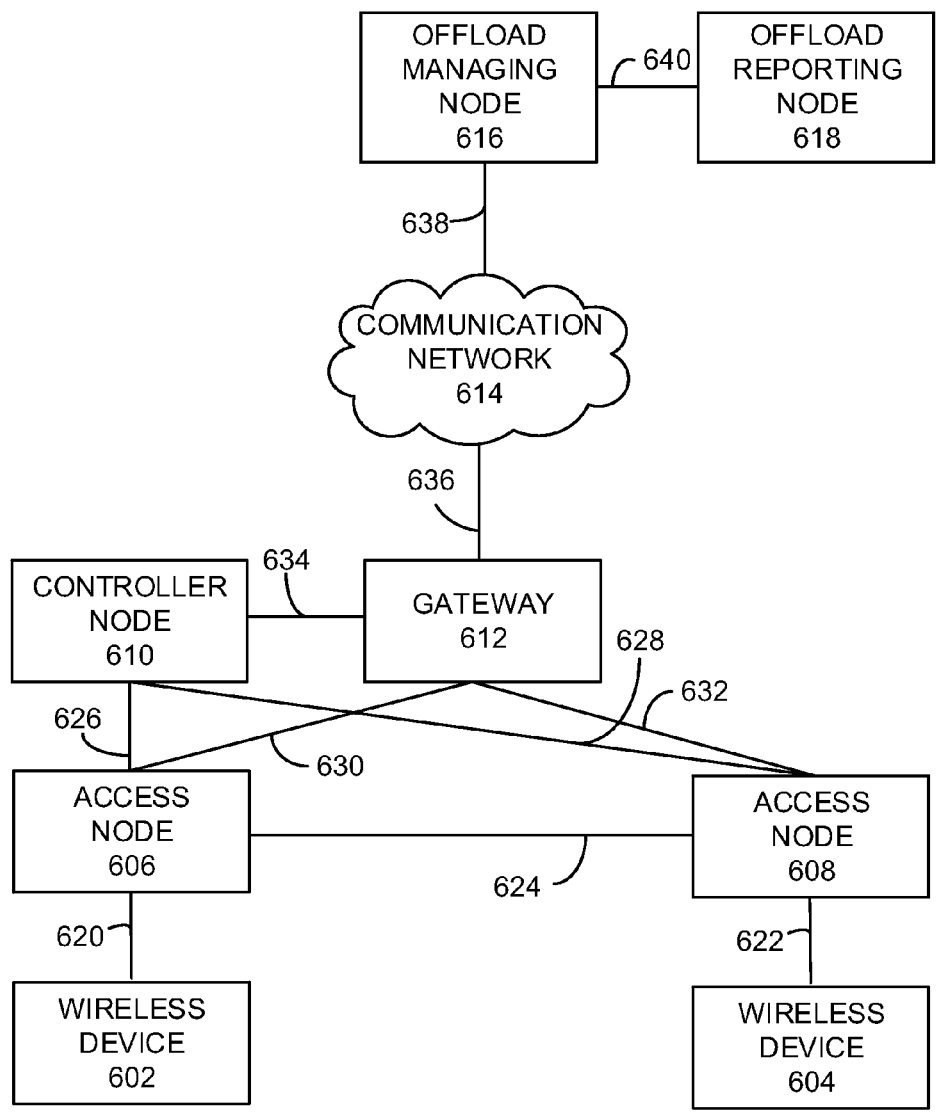
FIG. 6 illustrates another exemplary communication system to offload traffic in a wireless communication network.

FIG. 6 illustrates an exemplary communication system 600 for offloading traffic in a wireless communication network. Communication system 600 can comprise wireless devices 602, 604, access nodes 606, 608, controller node 610, gateway 612, communication network 614, offloading managing node 616, and offload reporting node 618. Other network elements may be present in the communication system 600 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 606, 608 and communication network 614, which are omitted for clarity, including additional processing nodes, routers, gateways, and physical and/or wireless data links for carrying data among the various network elements.

Wireless devices 602, 604 can be any device configured to communicate over communication system 600 using a wireless interface. For example, wireless devices 602, 604 can include a remote terminal unit, a cell phone, a smart phone, a computing platform such as a laptop, palmtop, or a tablet, a personal digital assistant, or an internet access device, and combinations thereof. It is noted that while one wireless device 602 is illustrated in FIG. 6 as being in communication with access node 606 and one wireless device 604 is illustrated as being in communication with access node 608, any number of wireless devices can be implemented according to various exemplary embodiments disclosed herein.

The wireless interface of wireless devices 602, 604 can include one or more transceivers for transmitting and receiving data over communication system 600. Each transceiver can be associated with a different frequency bands, the same or different radio access technologies, and/or the same or different network providers. For example, wireless devices 602, 604 can include a transceiver associated with at least one wireless cellular protocol and/or other types of wireless communication. For example, a transceiver can be associated with code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), etc.

Wireless device 602 can be in communication with access node 606 through communication link 620. Wireless device 604 can be in communication with access node 608 through communication link 622. Communication links 620, 622 can use various communication media, such as air, space, metal, optical fiber, or some other signal propagation path—including combinations thereof. Communication links 620, 622 may comprise many different signals sharing the same link. Communication links 620, 622 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 602 and access node 606 could share the same representative wireless link, but be transferred over different communication sessions, frequencies, timeslots, packets, ports, sockets, logical transport links, or in different directions—including combinations thereof.

Wireless devices 602, 604 can communicate information over system 600 using various communication services. These services can include various voice and/or data services and applications. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access nodes 606, 608 can be any network node configured to provide communication between wireless devices 602, 604 and communication network 614. For example, access nodes 606, 608 can be selected from a base transceiver station, a radio base station, an eNodeB device, or an enhanced eNodeB device, or the like. It is noted that while two access nodes 606, 608 are illustrated in FIG. 6, any number of access nodes can be implemented within system 600.

Access nodes 606, 608 can comprise a processor and associated circuitry to execute or direct the execution of computer-readable instructions to obtain information. Access nodes 606, 608 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 606, 608 can receive instructions and other input at a user interface.

Controller node 610 can be any network node configured to communicate control information over system 600. Controller node 610 can be a standalone computing device, computing system, or network component, and can be accessible, for example, by a wired or wireless connection, or through an indirect connection such as through a computer network or communication network. For example, controller node 610 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 610 is not limited to any specific technology architecture, such as Long Term Evolution (LTE) and can be used with any network architecture and/or protocol.

Controller node 610 can comprise a processor and associated circuitry to execute or direct the execution of computer-readable instructions to obtain information. Controller node 610 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 610 can receive instructions and other input at a user interface.

Gateway 612 can be any network node configured to interface with other network devices using various protocols. Gateway 612 can communicate user data over system 600. Gateway 612 can be a standalone computing device, computing system, or network component, and can be accessible, for example, by a wired or wireless connection, or through an indirect connection such as through a computer network or communication network. For example, gateway 612 can include a serving gateway (SGW) and/or a public data network gateway (PGW), etc. One of ordinary skill in the art would recognize that gateway 612 is not limited to any specific technology architecture, such as Long Term Evolution (LTE) and can be used with any network architecture and/or protocol.

Gateway 612 can comprise a processor and associated circuitry to execute or direct the execution of computer-readable instructions to obtain information. Gateway 612 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 612 can receive instructions and other input at a user interface.

Offload managing node 616 can be any network node configured to managing offloading mechanisms in the system 616. For example, offload managing node 616 can identify offload mechanism candidates. Offload managing node 616 can be a standalone computing device, computing system, or network component, and can be accessible, for example, by a wired or wireless connection, or through an indirect connection such as through a computer network or communication network. One of ordinary skill in the art would recognize that offload managing node 616 is not limited to any specific technology architecture, such as Long Term Evolution (LTE) and can be used with any network architecture and/or protocol.

Offload managing node 616 can comprise a processor and associated circuitry to execute or direct the execution of computer-readable instructions to obtain information. Offload managing node 616 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Offload managing node 616 can receive instructions and other input at a user interface.

Offload reporting node 618 can be any network node configured to report to the offload managing node 616 acceptable offloading conditions of wireless devices. Offload reporting node 618 can be a standalone computing device, computing system, or network component, and can be accessible, for example, by a wired or wireless connection, or through an indirect connection such as through a computer network or communication network. One of ordinary skill in the art would recognize that offload managing node 616 is not limited to any specific technology architecture, such as Long Term Evolution (LTE) and can be used with any network architecture and/or protocol.

Offload reporting node 618 can comprise a processor and associated circuitry to execute or direct the execution of computer-readable instructions to obtain information. Offload reporting node 618 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Offload reporting node 618 can receive instructions and other input at a user interface.

Access node 606 can be in communication with access node 608 through communication link 624. Controller node 610 can be in communication with access node 606 through communication link 626. Controller node 610 can be in communication with access node 608 through communication link 628. Gateway 612 can be in communication with access node 606 through communication link 630. Gateway 612 can be in communication with access node 608 through communication link 632. Controller node 610 can be in communication with gateway 612 through communication link 634. Gateway 612 can be in communication with communication network 614 through communication link 636. Offload managing node 616 can be in communication with communication network 614 through communication link 638. Offload managing node 616 can be in communication with offload reporting node 618 through communication link 640. Communication links 624, 626, 628, 630, 632, 634, 636, 638, 640 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 624, 626, 628, 630, 632, 634, 636, 638, 640 can be a direct link or might include various equipment, intermediate components, systems, and networks.

Communication network 614 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 614 can be capable of carrying data, for example, to support voice, push-to-talk, and data communications by a wireless device such as wireless devices 602, 604. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 614 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 614 can also comprise additional base stations, controller nodes, telephony switches, internet routers, network gateways, computer systems, communication links, or some other type of communication equipment, and combinations thereof.

In operation, it can be determined at a network node such as offloading managing node 616 that a performance parameter of a service area of the wireless communication network meets a performance threshold. The service area can include a first access node and a second access node, such as access nodes 606, 608. A profile of a first wireless device, such as wireless device 602 in communication with the first access node 606 and a profile of a second wireless device, such as wireless device 604 in communication with the second access node 608 can be determined by a network node such as the offload reporting node 618. The profile of the first wireless device comprises an acceptable offloading condition of the first wireless device 602 and the profile of the second wireless device comprises an acceptable offloading condition of the second wireless device 604. A plurality of offloading mechanisms can be identified by a network node such as the offloading managing node 616 based on the performance parameter of the service area. An estimated change in the performance parameter for each combination of one of the plurality of offloading mechanisms and the acceptable offloading conditions of the first wireless device 602 and the second wireless device 604. A network node such as the offload managing node 616 can select an offloading mechanism based on the estimated change in the performance parameter and the acceptable offloading conditions of the first wireless device 602 and the second wireless device 604. At least one of the first wireless device 602 and the second wireless device 604 can be instructed to establish communication with the wireless communication network using the selected offloading mechanism.

Figure 7:
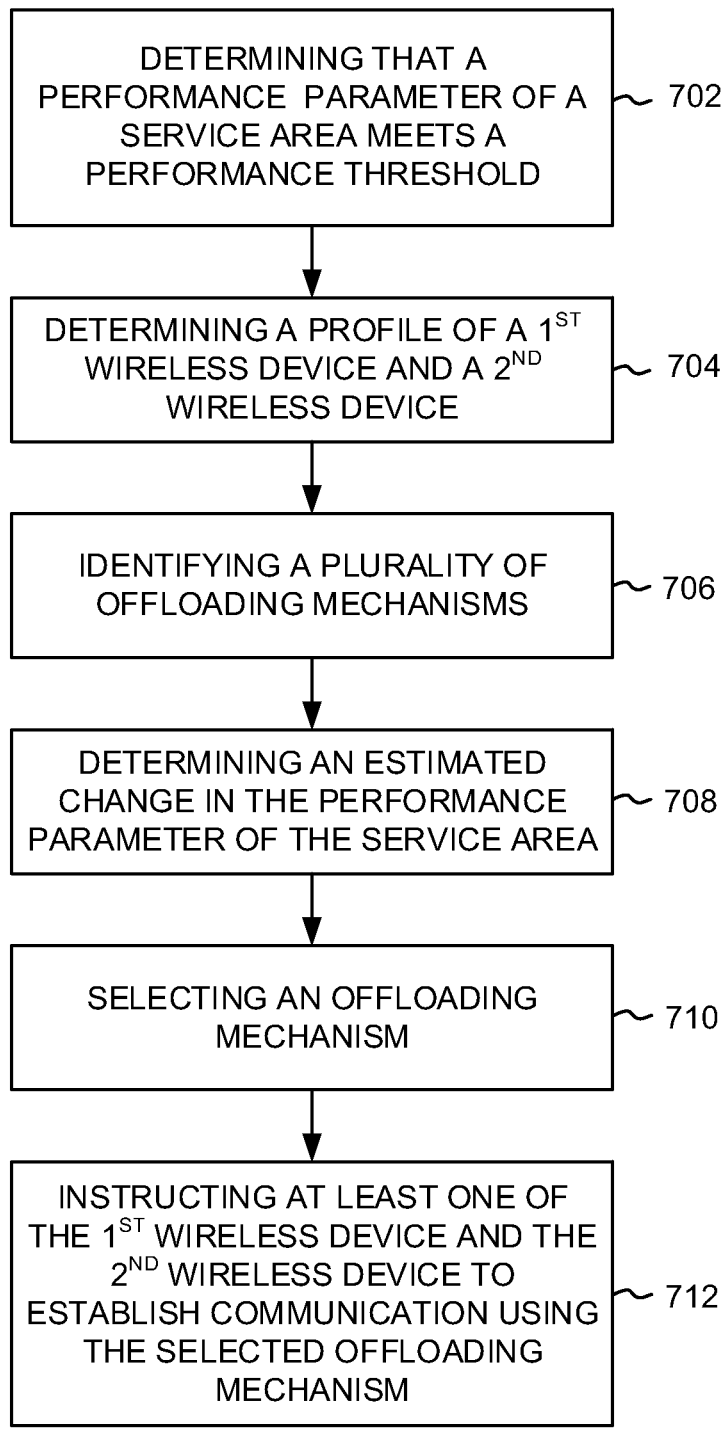
FIG. 7 illustrates another exemplary method of assigning resources in a wireless communication network.

FIG. 7 illustrates a flow chart of an exemplary method of assigning resources in a wireless communication network. The method will be discussed with reference to the exemplary communication system 600 illustrated in FIG. 6. However, the method can be implemented with any suitable communication system. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 702, a network node can determine that a performance parameter of a service area meets a performance threshold. For example, the offload managing node 616 can receive an indication that a performance parameter for the service area meets a performance threshold. The indication can be from one or more access nodes within the service area. The performance parameter can be indicative of a throughput capacity within the service area, a connection capacity of access nodes within the service area, a coverage capacity of the access nodes within the service area, or a combination thereof. The service area can comprise a plurality of access nodes such as access nodes 606, 608.

A profile of a first wireless device and a profile of a second wireless device can be determined. For example, offload reporting node 618 can determine a profile of wireless device 602 in communication with access node 606 and a profile of wireless device 604 in communication with access node 608. The profile can include information based on the types of offload mechanisms in which the users of wireless devices 602, 604 are willing to participate. The profile can further include information relating to a type of compensation the users of the wireless devices 602, 604 would accept for each offloading mechanism.

At 706, a plurality of offloading mechanisms can be identified. For example, offload managing node 616 can identify different offloading mechanisms based on the performance parameter of the service area. For example, offloading managing node 616 can identify a different access node such as a target access node in which wireless devices 602, 604 can establish a communication link, where the target access node is associated with the same network operator and/or a different network operator as access nodes 606, 608. The target access node can also be of the same radio access technology associated with access nodes 606, 608 or a different radio access technology. For instance, access nodes 606, 608 could be associated with cellular radio technology and an identified offloading mechanism can include an access node having WiFi radio access technology. Offloading managing node 616 can identify a different frequency band of the same and/or different radio access technology associated with access nodes 606, 608. Further, offloading managing node 616 can identify a micro cell access node such as a Femtocell or a picocell access node. The offloading managing node 616 can also identify another wireless device in communication with access nodes 606, 608 where the alternative wireless device can be configured to be initiated as a Wi-Fi hotspot.

An estimated change in the performance parameter of the service area can be determined at 608. For example, the offload managing node 616 can estimate a change in the performance parameter such as capacity, connection, and/or coverage relief that would occur based on each offloading mechanism. In addition, the offload managing node 616 can estimate the change in the performance parameter for each acceptable offloading condition preselected by the user of wireless devices 602, 604.

At 710, an offloading mechanism can be selected based on the estimated change in the performance parameter and the acceptable offloading condition. For example, offload managing node 616 can rank the offloading mechanisms based on the estimated change in the performance parameter of the service area in order to optimize relief to the network while reducing the number of wireless devices undesirably affected by the offloading process.

After an offloading mechanism is selected, at least one of a first wireless device and a second wireless device can be instructed to establish communication with the wireless communication network using the selected offloading mechanism at 712. For example, offload managing node 616 can instruct at least one of wireless devices 602, 604 to initiate communication with the selected offloading mechanism.

Figure 8:
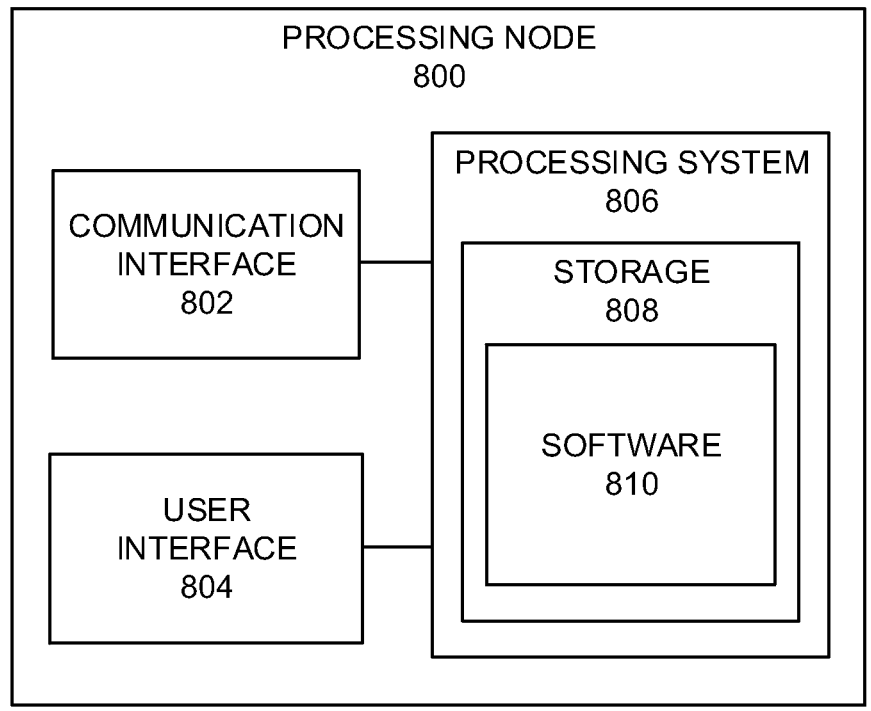
FIG. 8 illustrates an exemplary processing node according to an exemplary embodiment of the present disclosure.

FIG. 8 illustrates an exemplary processing node 800 in a communication system. Processing node 800 comprises communication interface 802, user interface 804, and processing system 806 in communication with communication interface 802 and user interface 804. Processing node 800 is capable of monitoring communications in a communication network. Processing system 806 includes storage 808, which can comprise a disk drive, flash drive, memory circuitry, or other memory device. Storage 808 can store software 810 which is used in the operation of the processing node 800. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include access nodes 104, 302, 306, 402, 502, 510, 606, 608, controller nodes 106, 610, offload managing nodes 110, 616, gateway 612, offload reporting node 618. Processing node 800 can also be an adjunct or component of a network element, such as an element of access nodes 104, 302, 306, 402, 502, 510, 606, 608, controller nodes 106, 610, offload managing nodes 110, 616, gateway 612, offload reporting node 618. Processing node 800 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of offloading traffic in a wireless communication network, comprising:
   determining at a network node that a performance parameter of an access node meets a performance threshold;
   determining a profile of a wireless device in communication with the access node, wherein the profile comprises an acceptable offloading condition and a user-selectable compensation;
   identifying one or more offloading mechanisms based on the performance parameter and the acceptable offloading condition;
   determining an estimated change in the performance parameter for each combination of the one or more offloading mechanisms and the acceptable offloading condition;
   wherein determining the estimated change in the performance parameter includes estimating the change in the performance parameter based on a capacity criteria of the offloading mechanism;
   selecting an offloading mechanism based on the estimated change in the performance parameter, the acceptable offloading condition, and the user-selectable compensation; and
   instructing the wireless device to establish communication with the wireless communication network using the selected offloading mechanism.

2. The method of claim 1, further comprising:
   monitoring a device criteria after the wireless device is in communication with the wireless communication network using the selected offloading mechanism to determine whether to modify or terminate communication with the selected offloading mechanism based on a device criteria threshold.

3. The method of claim 2, further comprising:
   instructing the wireless device to reestablish communication with the access node when the device criteria does not meet the device criteria threshold.

4. The method of claim 1, further comprising:
   determining at the network node compensation attributed to the wireless device based on the acceptable offloading condition, the user-selectable compensation, and the selected offloading mechanism.

5. The method of claim 1, wherein identifying the one or more offloading mechanisms is based on at least one of a connection criteria of the access node, a capacity criteria of the access node, and a coverage criteria of the access node.

6. The method of claim 1, wherein determining the estimated change in the performance parameter further comprising:
   estimating the change in the performance parameter based on at least one of a connection criteria of the offloading mechanism, a coverage criteria of the offloading mechanism, and a device characteristic of the wireless device.

7. A method of offloading traffic in a wireless communication network, comprising:
   determining at a network node that a performance parameter of a service area of the wireless communication network meets a performance threshold, wherein the service area comprises a first access node and a second access node;
   determining a profile of a first wireless device in communication with the first access node and a profile of a second wireless device in communication with the second access node, wherein the profile of the first wireless device comprises an acceptable offloading condition of the first wireless device and a first user-selectable compensation, and the profile of the second wireless device comprises an acceptable offloading condition of the second wireless device and a second user-selectable compensation;
   identifying one or more offloading mechanisms based on the performance parameter of the service area;
   determining an estimated change in the performance parameter for each combination of the one or more offloading mechanisms and the acceptable offloading conditions of the first wireless device and the second wireless device;
   wherein determining the estimated change in the performance parameter includes estimating the change in the performance parameter based on a capacity criteria of the offloading mechanism;
   selecting a first offloading mechanism based on the estimated change in the performance parameter, the acceptable offloading conditions of the first wireless device and the second wireless device, and at least one of the first and second user-selectable compensations; and
   instructing at least one of the first wireless device and the second wireless device to establish communication with the wireless communication network using the first selected offloading mechanism.

8. The method of claim 7, further comprising:
   instructing the first wireless device to discontinue communication with the first access node and reestablish communication with the wireless communication system using the first selected offloading mechanism.

9. The method of claim 7, further comprising:
instructing the second wireless device to discontinue communication with the second access node and reestablish communication with the wireless communication system using the first selected offloading mechanism.

10. The method of claim 7, further comprising:
selecting a second offloading mechanism based on the one or more offloading mechanisms and the predetermined offloading criteria; and
instructing the first wireless device and the second wireless device to establish communication with the first selected offloading mechanism; and
instructing the first selected offloading mechanism to establish communication with the wireless communication network using the second selected offloading mechanism.

11. The method of claim 7, further comprising:
monitoring a device criteria of at least one of the first wireless device and the second wireless device after at least one of the first wireless device and the second wireless device is in communication with the wireless communication network using the first selected offloading mechanism to determine whether to modify or terminate communication with the first selected offloading mechanism based on a device criteria threshold.

12. The method of claim 7, further comprising:
monitoring the performance parameter of the service area after instructing at least one of the first wireless device and the second wireless device to establish communication with the wireless communication network using the first selected offloading mechanism; and
determining whether to modify or terminate communication between the at least one of the first wireless device and the second wireless device and the first selected offloading mechanism.

13. The method of claim 7, further comprising:
determining at the network node compensation attributed to at least one of the first wireless device and the second wireless device instructed to establish communication with the wireless communication network using the first selected offloading mechanism based on at least one of the first and second user-selectable compensations.

14. The method of claim 7, wherein identifying the one or more offloading mechanisms is based on at least one of a connection criteria of the service area, a capacity criteria of the first access node, a capacity criteria of the second access node, and a coverage criteria of the service are.

15. A system for offloading traffic in a wireless communication network, comprising:
a processing node configured to
determine that a performance parameter of a service area of the wireless communication network meets a performance threshold, wherein the service area comprises a first access node and a second access node,
determine a profile of a first wireless device in communication with the first access node and a profile of a second wireless device in communication with the second access node, wherein the profile of the first wireless device comprises an acceptable offloading condition of the first wireless device and a first user-selectable compensation, and the profile of the second wireless device comprises an acceptable offloading condition of the second wireless device and a second user-selectable compensation;
identify one or more offloading mechanisms based on the performance parameter of the service area,
determine an estimated change in the performance parameter for each combination of the one or more of the plurality of offloading mechanisms and the acceptable offloading conditions of the first wireless device and the second wireless device,
wherein determining the estimated change in the performance parameter includes estimating the change in the performance parameter based on a capacity criteria of the offloading mechanism;
select a first offloading mechanism based on the estimated change in the performance parameter, the acceptable offloading condition of the first wireless device and the second wireless device, and at least one of the first and second user-selectable compensations, and
instruct at least one of the first wireless device and the second wireless device to establish communication with the wireless communication network using the selected offloading mechanism.

16. The system of claim 15, wherein the processing node is further configured to
instruct the first wireless device to discontinue communication with the first access node and reestablish communication with the wireless communication network using the first selected offloading mechanism.

17. The system of claim 15, wherein the processing node is further configured to
instruct the second wireless device to discontinue communication with the second access node and reestablish communication with the wireless communication network using the first selected offloading mechanism.

18. The system of claim 15, wherein the processing node is further configured to
select a second offloading mechanism based on the one or more offloading mechanisms, the predetermined offloading criteria, and at least one of the first and second user-selectable compensations,
instruct the first wireless device and the second wireless device to establish communication with the first selected offloading mechanism, and
instruct the first selected offloading mechanism to establish communication with the wireless communication network using the second selected offloading mechanism.

19. The system of claim 15, wherein the processing node is further configured to
monitor a device criteria of at least one of the first wireless device and the second wireless device after at least one of the first wireless device and the second wireless device is in communication with the wireless communication network using the first offloading mechanism to determine whether to modify or terminate communication with the first selected offloading mechanism based on a device criteria threshold.

20. The system of claim 15, wherein the processing node is further configured to
monitor the performance parameter of the service area after instructing at least one of the first wireless device and the second wireless device to establish communication with the wireless communication network using the first selected offloading mechanism, and
determine whether to modify or terminate communication between the at least one of the first wireless device and the second wireless device and the first selected offloading mechanism.

* * * * *